US00RE43075E

(19) United States
(12) Reissued Patent
Kroeger et al.

(10) Patent Number: US RE43,075 E
(45) Date of Reissued Patent: Jan. 10, 2012

(54) HEADBLOCK AND FINGERBOARD SUPPORT

(75) Inventors: Kevin M. Kroeger, Corona, CA (US); Meaulnes Laberge, Graham, WA (US); Timothy P. Shaw, Madison, TN (US); Daniel J. Smith, Corona, CA (US); Donald Scott Wade, Jr., Tempe, AZ (US)

(73) Assignee: Fender Musical Instruments Corporation, Scottsdale, AZ (US)

(21) Appl. No.: 12/893,734

(22) Filed: Sep. 29, 2010

Related U.S. Patent Documents

Reissue of:
(64) Patent No.: 7,465,859
Issued: Dec. 16, 2008
Appl. No.: 11/446,079
Filed: Jun. 1, 2006

(51) Int. Cl.
*G10D 3/00* (2006.01)
*G10D 1/08* (2006.01)

(52) U.S. Cl. ..... 84/293; 84/173; 84/267; 84/314 R

(58) Field of Classification Search ..... 84/293
See application file for complete search history.

(56) References Cited

U.S. PATENT DOCUMENTS

| | | | | |
|---|---|---|---|---|
| 4,027,570 | A | 6/1977 | Rendell et al. | |
| 4,172,405 | A | 10/1979 | Kaman, II | |
| 4,200,023 | A | 4/1980 | Kaman | |
| 4,939,970 | A * | 7/1990 | Hoshino et al. | 84/293 |
| 5,072,643 | A | 12/1991 | Murata | |
| 5,233,122 | A * | 8/1993 | Kim | 84/293 |
| 5,353,672 | A * | 10/1994 | Stewart | 84/291 |
| 5,469,770 | A | 11/1995 | Taylor | |
| 5,503,054 | A | 4/1996 | Ellsworth et al. | |
| 6,051,766 | A | 4/2000 | Taylor | |
| 6,265,648 | B1 | 7/2001 | Steinberger | |
| 6,350,939 | B1 | 2/2002 | Griffiths | |
| 6,833,501 | B2 | 12/2004 | Jagmin | |
| 6,897,366 | B2 | 5/2005 | McPherson | |

FOREIGN PATENT DOCUMENTS

| | | |
|---|---|---|
| JP | 50-043556 | 4/1975 |
| JP | 54-150113 | 11/1979 |
| JP | 62-083120 | 4/1987 |
| JP | 63-079123 | 4/1988 |
| JP | 01-502540 | 8/1989 |
| JP | 02-073295 | 3/1990 |
| JP | 2000187481 | 7/2000 |
| JP | 2002-062866 | 2/2002 |
| KR | 20-19930007822 | 11/1993 |
| WO | 88/07251 | 9/1988 |

* cited by examiner

*Primary Examiner* — Elvin G Enad
*Assistant Examiner* — Christopher Uhlir
(74) *Attorney, Agent, or Firm* — Robert D. Atkins, Patent Law Group

(57) ABSTRACT

A headblock and fingerboard support assembly for a stringed instrument includes a fingerboard support assembly for mounting to a neck and fingerboard of the stringed instrument. The fingerboard support assembly further includes a plate having an integrated rail structure. A headblock has an integrated channel for receiving the integrated rail structure. The headblock is adapted to secure to the fingerboard support assembly. A method of assembling a stringed instrument includes mounting a plate structure to a neck and fingerboard of the stringed instrument, where the plate includes an integrated rail, and mounting a headblock to an interior surface of a body of the stringed instrument, where the headblock has an integrated channel structure for receiving the integrated rail of the plate structure.

8 Claims, 8 Drawing Sheets

42
38
34
28
40
42
34
46
44
45
28
40
14
24
28
46
44
40
14
24
47

HEADBLOCK AND FINGERBOARD SUPPORT

Matter enclosed in heavy brackets [ ] appears in the original patent but forms no part of this reissue specification; matter printed in italics indicates the additions made by reissue.

FIELD OF THE INVENTION

The present invention relates in general to musical instruments and, more particularly, to a headblock and fingerboard support apparatus for stringed musical instruments.

BACKGROUND OF THE INVENTION

Guitars are popular musical instruments and are used commonly by both amateur and professional musicians. The acoustic-type guitar generally has a hollow body which is connected to a neck. The hollow body includes a backboard and a soundboard. Integrated into a central area of the soundboard is a soundhole. The backboard and soundboard are connected by a shaped sidewall. The neck and body are generally connected together using a structure commonly known as a headblock. The neck terminates at a joint where the neck and headblock come together in a neck-to-body joint.

Guitars have a series of strings strung at substantial tension from a bridge on the soundboard, across the soundhole, and along the neck. Guitars originally made use of low tension strings made of gut, and later of nylon. Later, steel strings were incorporated into guitars. The use of steel strings dramatically increased the tensile forces which act on the body and neck of the guitar. The substantial increase in tension associated with the use of steel strings has also led to an increase in failure modes, particularly in places where subcomponents of the guitar come together at various joints.

Prior art designs have attempted to improve upon the strength and durability of guitars without adversely affecting playing qualities. Improvements have included bracing patterns on the underside of the soundboard, or neck-to-body joint configurations for strengthening the joint area of a guitar.

Notwithstanding the various improvements, the manufacture of guitars, particularly acoustic guitars which generally use wood materials in construction of the instrument, is subject to a great deal of variability in the completed product. The physical qualities of wood material can vary from piece to piece, and environmental factors such as humidity, also play a role on the overall physical characteristics of the various subcomponents which are integrated into a manufactured guitar.

In addition, guitars continue to suffer from a lack of strength and rigidity as well as a tendency to move or rotate at joints, particularly in the neck-to-body joint. To lessen the effects of variability, as well as promote rigidity and stability, manufacturers have traditionally relied on extremely precise tooling and/or individual skill to enable the various subcomponents of the instrument to fit closely together. However, the skill of an individual craftsman varies, as does the raw material used in the manufacturing process.

A need exists for an apparatus, method of assembly, and method of manufacture of a neck-to-body joint of a guitar which increases the physical integrity of the instrument. In addition, the apparatus, method of assembly and method of manufacture must be able to be reproduced with a high degree of consistency.

SUMMARY OF THE INVENTION

In one embodiment, the present invention is a headblock and fingerboard support assembly for a stringed instrument, comprising a fingerboard support assembly for mounting to a neck and fingerboard of the stringed instrument, the fingerboard support assembly including a plate having an integrated rail structure, and a headblock having an integrated channel for receiving the integrated rail structure, wherein the headblock is adapted to secure to the fingerboard support assembly.

In another embodiment, the present invention is a headblock and fingerboard support assembly for a stringed instrument, comprising a plate having an integrated rail, and a headblock for mounting in the body of the stringed instrument, the headblock having an integrated channel, which receives the integrated rail of the plate.

In yet another embodiment, the present invention is a method of assembling a stringed instrument, comprising mounting a plate structure to a neck and fingerboard of the stringed instrument, wherein the plate includes an integrated rail, and mounting a headblock to an interior surface of a body of the stringed instrument, wherein the headblock has an integrated channel structure for receiving the integrated rail of the plate structure.

In still another embodiment, the present invention is a method of manufacturing a headblock and fingerboard support assembly for a stringed instrument, comprising providing a plate having an integrated rail, and providing a headblock for mounting in the body of the stringed instrument, the headblock having an integrated channel, which receives the integrated rail of the plate.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1A:
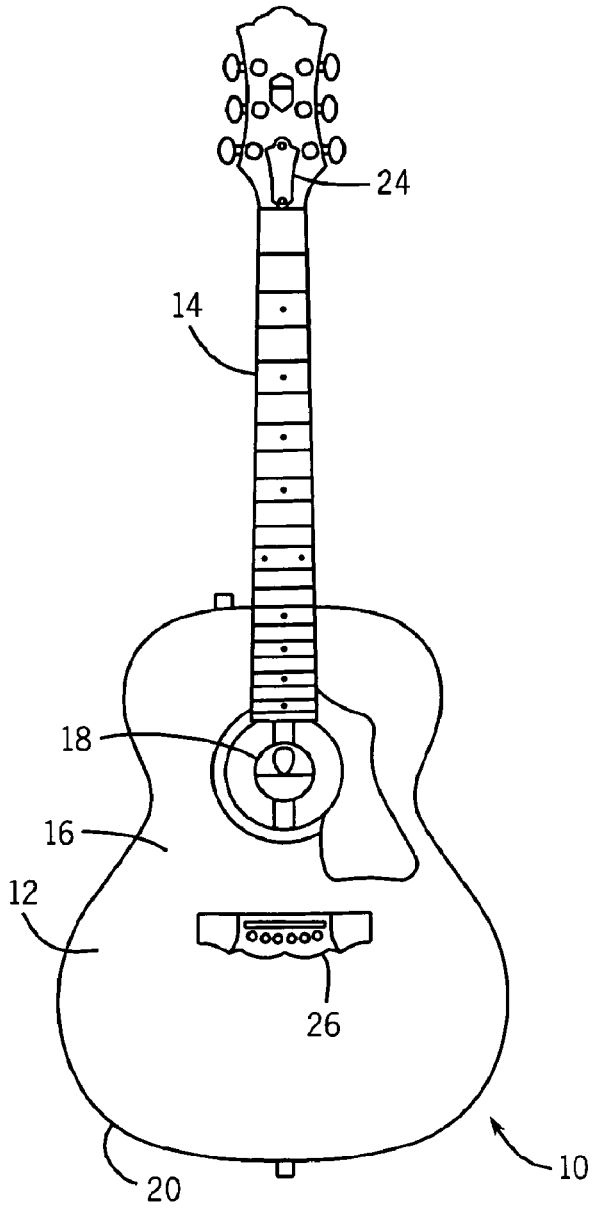
FIG. 1a illustrates a top view of a guitar.

FIG. 1a depicts a top view of a guitar 10. Guitar 10 includes a body 12 and a neck 14, is illustrated. The body 12 has a soundboard 16 with a circular soundhole 18. The soundboard 16 is connected to sidewall 20, which in turn, is connected to a backboard 22. The neck 14 has a headstock 24. Strings (not shown) are strung from headstock 24, along the neck 14, across the soundhole 18, and to a bridge 26 on the soundboard 16.

Figure 1B:
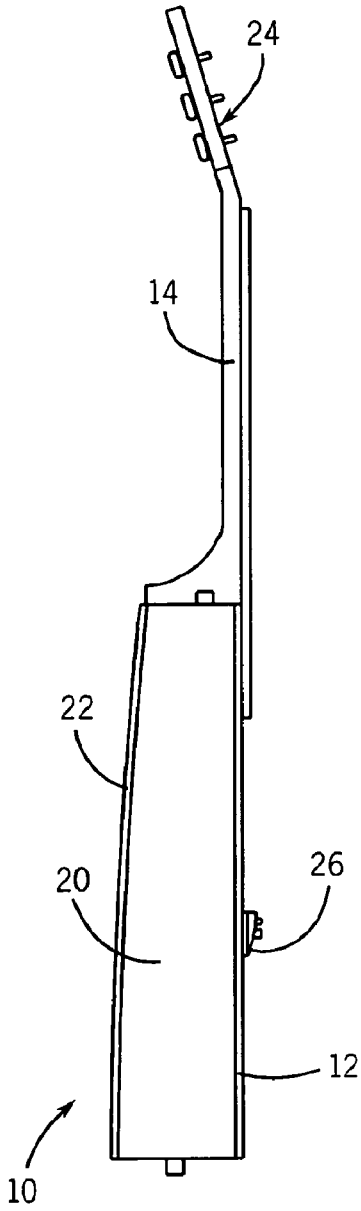
FIG. 1b illustrates a side view of a guitar.

FIG. 1b depicts a side view of a guitar 10. Again, guitar 10 includes a body 12 and a neck 14. Soundboard 16 is again connected to sidewall 20 and backboard 22.

To provide structural rigidity to guitar 10 and promote consistent joint integrity in an assembled guitar, a headblock and fingerboard support assembly can be utilized. A headblock can be mounted in an interior surface of the body of guitar 10. A fingerboard support assembly is mounted to a neck 14 of guitar 10. The headblock receives the fingerboard support assembly to form a neck-to-body joint. The headblock and fingerboard support assembly can be formed out of a composite material which includes fibers which are laid-up in a particular arrangement for a desired stiffness. Use of a headblock and fingerboard assembly in guitar 10 provides a uniform structure which is more easily manufactured to a consistent, high degree of precision. The neck to body joint is consistently of high quality, as a result.

Figure 2A:
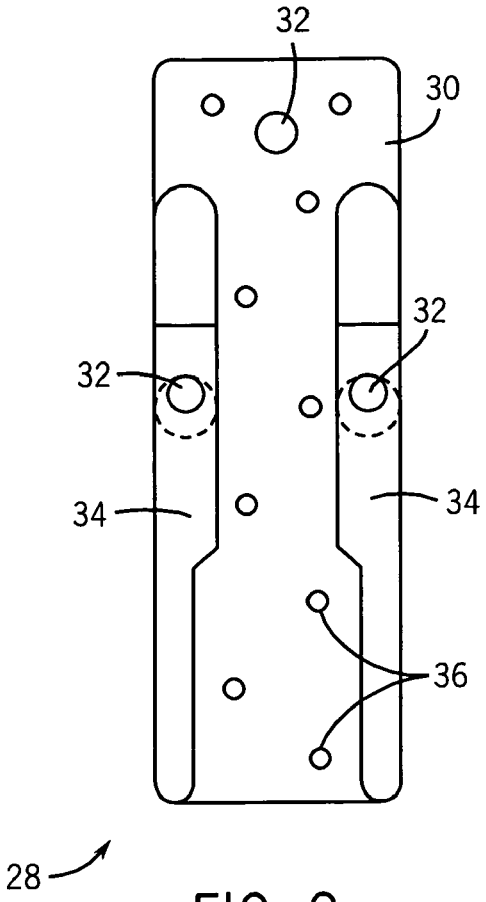
FIG. 2a illustrates a top view of a plate structure for a fingerboard support assembly.

Turning to FIG. 2a, a support plate 28 for a fingerboard support assembly is depicted. Plate 28 is intended to be a highly-rigid composite component. Again, plate 28 can be composed of a carbon fiber reinforced plastic (CFRP) or similar composite material with fibers which are selected to be oriented in a particular fashion to provide for a precise degree of stiffness. In addition, the selection of the composite material can be such that the intended rigidity varies across a surface of plate 28, so that a particular region of plate 28 is more rigid than another particular region of plate 28. As a result, extra rigidity and support can be provided in areas of plate 28 which take advantage of the extra rigidity and support, while not sacrificing the overall tonal quality of the guitar 10. The composite material making up plate 28 can be chopped and molded or can utilize laid-up fibers which are arranged in a particular orientation. A composite plate 28 can be manufactured using known techniques for forming composite materials.

Plate 28 includes bottom surface 30. A series of threaded inserts 32 are disposed through bottom surface 30. Threaded inserts 32 are configured to allow for an attachment mechanism such as a screw or a bolt, which can pass through the threaded insert to couple to another subcomponent piece of guitar 10.

Plate 28 is shown with two integral rails 34. Rails 34 are unitary in construction with plate 28. Rails 34 are disposed along substantially the bottom surface 30 of plate 28, one rail 34 disposed on opposing sides of bottom surface 30. Rails 34 are intended to secure to an integrated channel formed in a headblock which is mounted to an interior surface of the body of guitar 10. Rails 34 can vary in overall shape for a particular application. Rails 34, as shown, have a tapered design to provide for ease of assembly.

Apertures 36 are disposed throughout plate 28, forming an opening from the bottom surface of plate 28 to a top surface of plate 28. Apertures 36 are intended to allow for adhesive material such as epoxy to penetrate the plate structure and obtain a better overall bond to the plate 28.

Figure 2B:
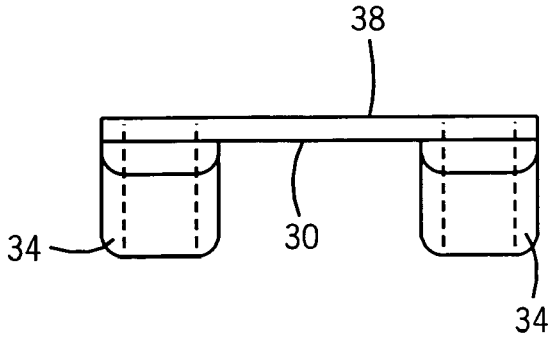
FIG. 2b illustrates a side view of a plate structure.
Figure 2C:
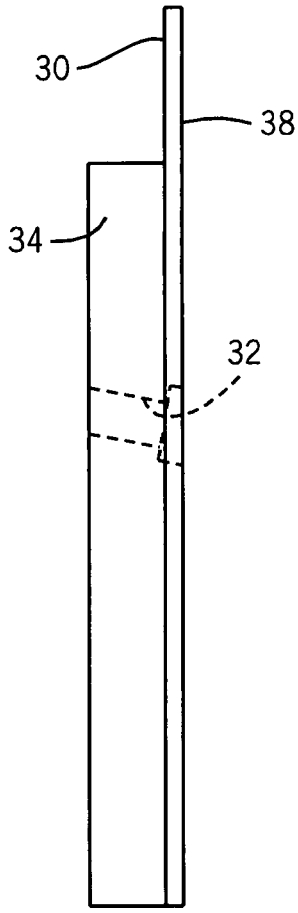
FIG. 2c illustrates an additional side view of the plate structure.

FIG. 2b shows a side view of plate 28. Again, rails 34 are depicted disposed on opposite sides of the bottom surface 30. A top surface 38 is intended to interface with a bottom portion of a fingerboard of the guitar 10, as will be later described. FIG. 2c depicts an additional side view of plate 28. Again, surfaces 30 and 38 are shown, as well as a rail 34. Threaded insert 32 is again shown. Threaded insert 32 is configured at an angle larger than 90 degrees from vertical. In one embodiment, insert 32 is configured at an angle of approximately 30 degrees from vertical. Use of an angled insert 32 configuration allows a fingerboard to be drawn down to a top surface of the body 12 of guitar 10 in a tight-fitting and precise manner.

Figures 3A, 3B, 3C:
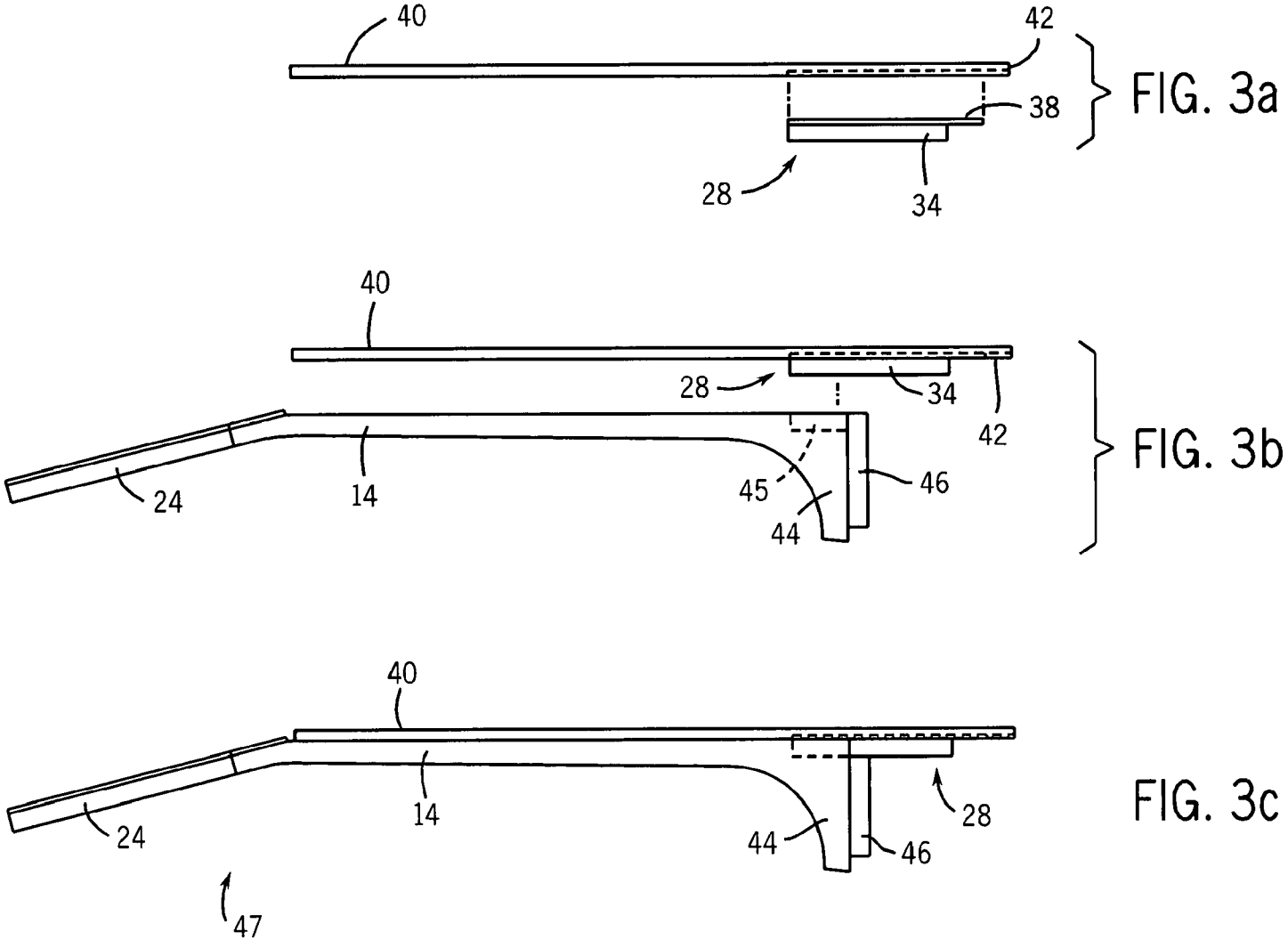
FIG. 3a illustrates a first step in a method of securing a plate structure to a fingerboard of a guitar.
FIG. 3b illustrates a second step in the method of securing a plate structure and fingerboard to a neck of a guitar.
FIG. 3c illustrates a third step in the method, showing an assembled neck having an integrated fingerboard support assembly including a plate structure.

Turning to FIG. 3a, a first step in a method to secure a fingerboard support assembly to a neck 14 of guitar 10 is depicted. The fingerboard support assembly includes a plate 28 which is first secured to a fingerboard 40 as shown. Fingerboard 40 includes a recess 42 or cavity 42 which is integrated into a bottom surface of fingerboard 40. The recess 42 receives plate 28. Rails 34 protrude downwards from plate 28. The depth of recess 42 is approximately the same as the depth from top surface 38 to bottom surface 30 of plate 28. As a result, the recess receives plate 28, making the bottom surface 30 of plate 28 approximately flush with a bottom surface of fingerboard 40. Fingerboard 40 can be secured to plate 28 using an epoxy or similar adhesive or glue material to form a tight and strong joint.

Turning to FIG. 3b, a next step in the method to secure the fingerboard support assembly is shown. Fingerboard support assembly is shown with an assembled fingerboard 40, plate 28 with integral rail 34. A neck 14 of guitar 10 with attached headstock 24 is depicted. Neck 14 also includes a heel portion 44. Disposed at an end of the neck 14 is an additional cavity 45 along a top surface of neck 14 for receiving a portion of the rail 34 of plate 28. The end portion of neck 14 includes a tongue structure 46, which is a common element in many neck to body joints.

FIG. 3c shows a next step in the method which now includes a fully assembled neck 14 assembly 47. Again, headstock 24, plate 28, and fingerboard 40 are depicted as fully assembled components. Assembly 47, using plate 28, keeps fingerboard 40 from bending where fingerboard 40 meets guitar body 12. The neck-to-body joint is provided additional stiffness and rigidity.

Figure 3D:
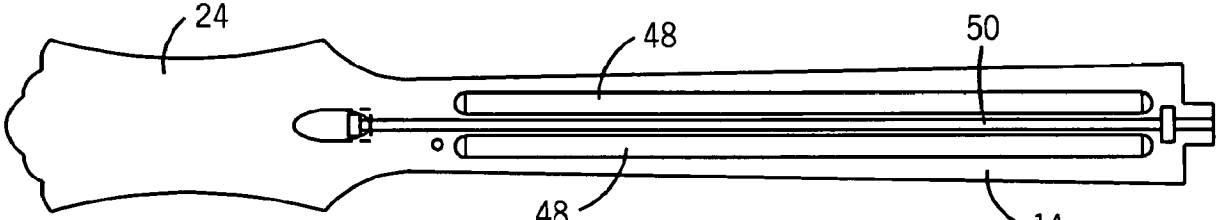
FIG. 3d illustrates a neck of a guitar having integrated support rods and a truss rod.

FIG. 3d shows neck 14 in an additional embodiment. Neck 14 includes a headstock 24. A set of two parallel recesses are disposed along the length of neck 14 as depicted. A support rod 48 is secured to each recess. Rods 48 can be composed of graphite, metal, a composite material, or any combination thereof. In addition to rods 48, an additional truss rod 50 is disposed in a recess located along a center axis of the neck 14 as shown. Truss rod 50 can also be composed of a variety of materials. Rod 50, in combination with rods 48, provide additional rigidity and support along the long axis of neck 14, from the neck to body joint to the headstock 24. In an additional embodiment, rods 48, 50 can be adapted to extend through an end of neck 14 to penetrate the body 12 of guitar 10 as will be further described. Assembly 47 continues the stiffening action of the rods 48, 50 across the neck to body joint of guitar 10.

Figure 4B:
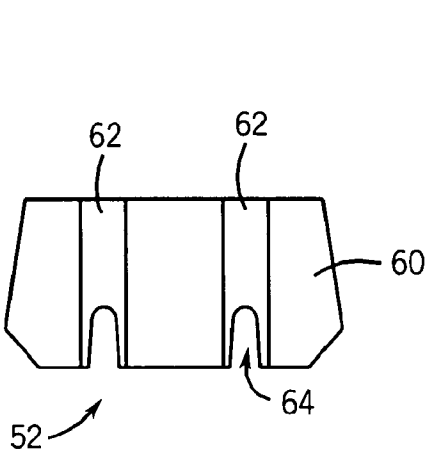
FIG. 4b illustrates a top view of the headblock, again showing an integrated channel structure.
Figure 4A:
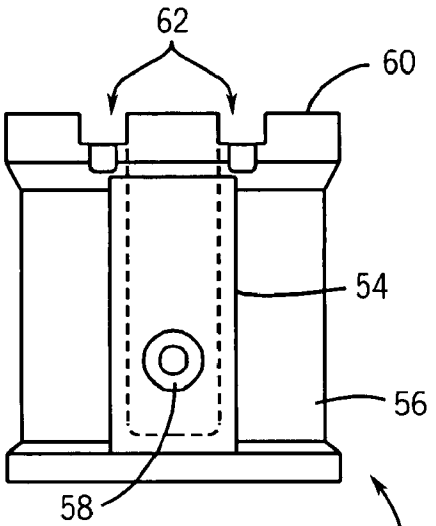
FIG. 4a illustrates a side view of a headblock having integrated channels for receiving a plate structure.

Turning to FIG. 4a, a front view of a headblock 52 is depicted. Headblock 52 is intended to mount to an interior surface of the body 12 of guitar 10 at the neck to body joint location. Ridge 54 is shown which continues down a central vertical axis of headblock 52. Ridge 54 has a corresponding cavity on an opposite side of ridge 54 for receiving the tongue 46 portion of an assembled neck 14. Headblock 52 includes a surface 56 on each side of headblock 52, as well as a top surface 60. Aperture 58 allows a connecting mechanism such as a bolt or screw to penetrate aperture and secure headblock 52 to the body 12.

As depicted, two channels 62 are disposed along the top surface 60 of headblock 52. Channels 62 are intended to receive the integrated rail 34 portion of plate 28. FIG. 4b better illustrates channels 62. Again, as shown, channels 62 are disposed along the entire top surface 60 of headblock 52. Cutouts 64 are intended to capture screws used to assemble the neck 14 and body 12 of guitar 10.

Figure 4C:
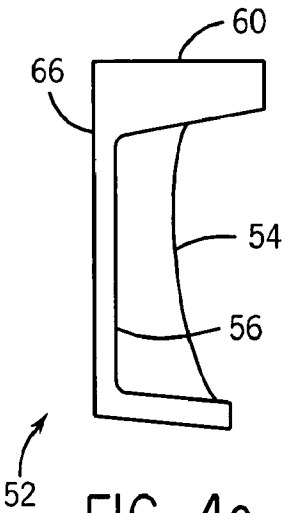
FIG. 4c illustrates an additional side view of a headblock and depicts a "C" shape.

FIG. 4c shows a side view of headblock 52. Here, the side view allows the "C" shape of surface 54 to be illustrated. Surface 54 tapers from the ends to a central portion of headblock 52, as depicted, to provide vertical support along the surface 54. Again, side surface 56 is shown, as well as top surface 60. A back surface 66 is substantially flat to allow headblock 52 to secure to the interior neck-to-body joint region of body 12.

Again, headblock 52 can be composed of a molded or formed composite material. Here, as in plate 28, the composite material can be selected to provide a specified amount of support and rigidity, and can be adapted to vary across any surface(s) of the headblock 52 for a particular application. Headblock 52 functions to receive the neck 14 and hold the neck 14 firmly in a desired location and position, at the desired angle and orientation relative to the body 12 of guitar 10.

Neck 14, including plate 28, can be intended to not be permanently secured to headblock 52 and, thereby, body 12. Instead, the headblock 52 and fingerboard support assembly 49 can be fastened with screws or bolts to securely mount the assembly 49 to headblock 52, but also to allow the completed guitar to be disassembled if needed or desired. The flexibility of disassembly adds unique functionality to the instrument and flexibility in the manufacturing and assembly process.

Figure 4D:
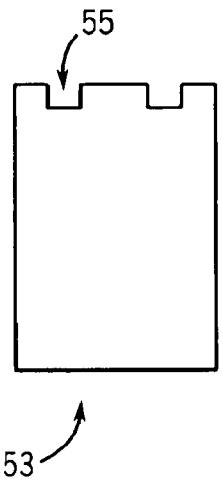
FIG. 4d illustrates a shim structure to assist in mounting a headblock to a body of a guitar.

FIG. 4d illustrates a shim structure 53 which is intended to interface the headblock 52 with the interior surface of body 12. In the illustration shown, shim 53 interfaces the back surface 66 of headblock 52 with the corresponding interior vertical surface of body 12. However, each surface of headblock 52, such as top surface 60 and side surfaces 56 can be provided with corresponding shim structures 53 to interface the surfaces with corresponding interior surfaces of body 12. The shim structures 53 correspond to the respective surface of the headblock 52. Shim 53 is intended to be a thin piece of material, generally composed of wood but able to be composed of other materials. As shown, shim 53 is shaped in the outline of headblock 52, including two integrated channels 55 to reflect the outline of headblock 52.

The use of shim 53 allows the same headblock 52 to be used in a variety of guitar manufacturing scenarios. A single headblock 52 can be used to join together the neck 14 and body 12 of guitars 10 having differing interior surface features. As a result, the manufacturing process is made more efficient, yet each headblock 52 fits snugly and appropriately in a particular setting. Because shim 53 is composed of wood, shim 53 is easily sanded to a particular shape. Sanding a composite headblock 52 would present a host of additional problems into the manufacturing process, which the introduction of shim 53 eliminates.

Figure 4E:
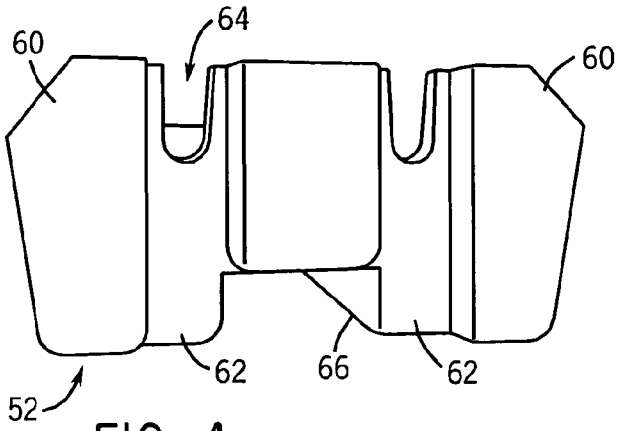
FIG. 4e illustrates a first, three-dimensional view of a headblock.
Figure 4F:
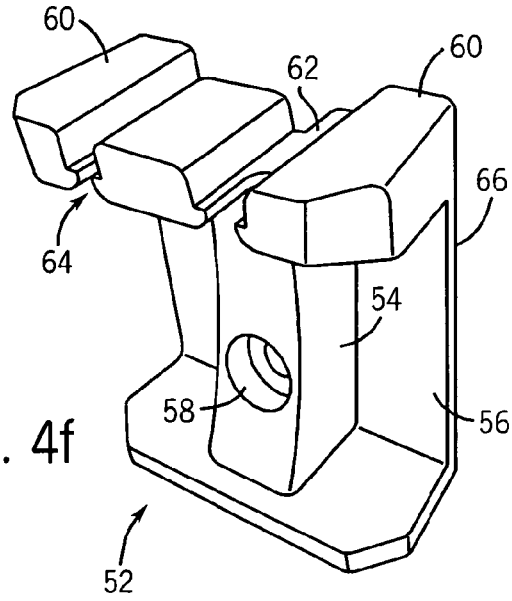
FIG. 4f illustrates a second, three-dimensional view of a headblock.
Figure 4G:
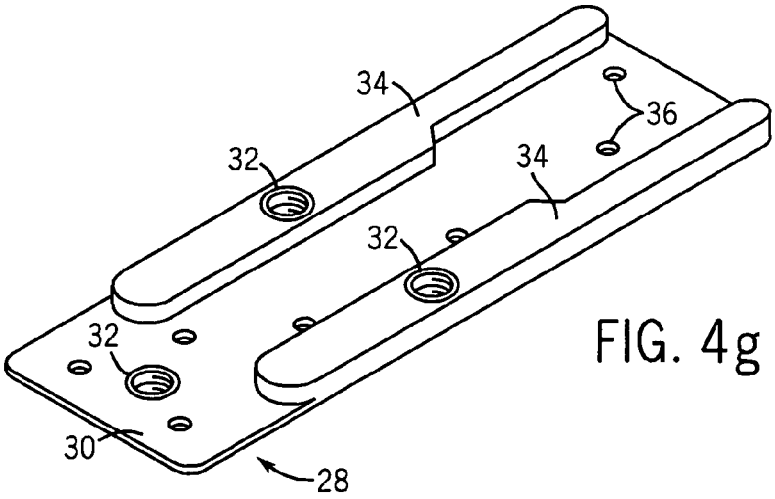
FIG. 4g illustrates a three-dimensional view of a plate structure.

FIG. 4e depicts a first, three-dimensional, top-view of headblock 52. Again, top surface 60 is seen, as is channels 62 and cutouts 64. Back surface 66, which interfaces with shim 53, is again shown. FIG. 4f depicts a second, three-dimensional, side-view of headblock 52. Ridge 54 is again shown, as is side surface 56, aperture 58, top surface 60, channels 62, cutouts 64, and back surface 66. FIG. 4g depicts a three-dimensional, bottom view of plate 28. Plate 28 includes bottom surface 30 as depicted. Rails 34 are integrated into plate 28 at bottom surface 30. Inserts 32 are seen, as well as apertures 36 as previously described to assist in assembly.

Figure 5A:
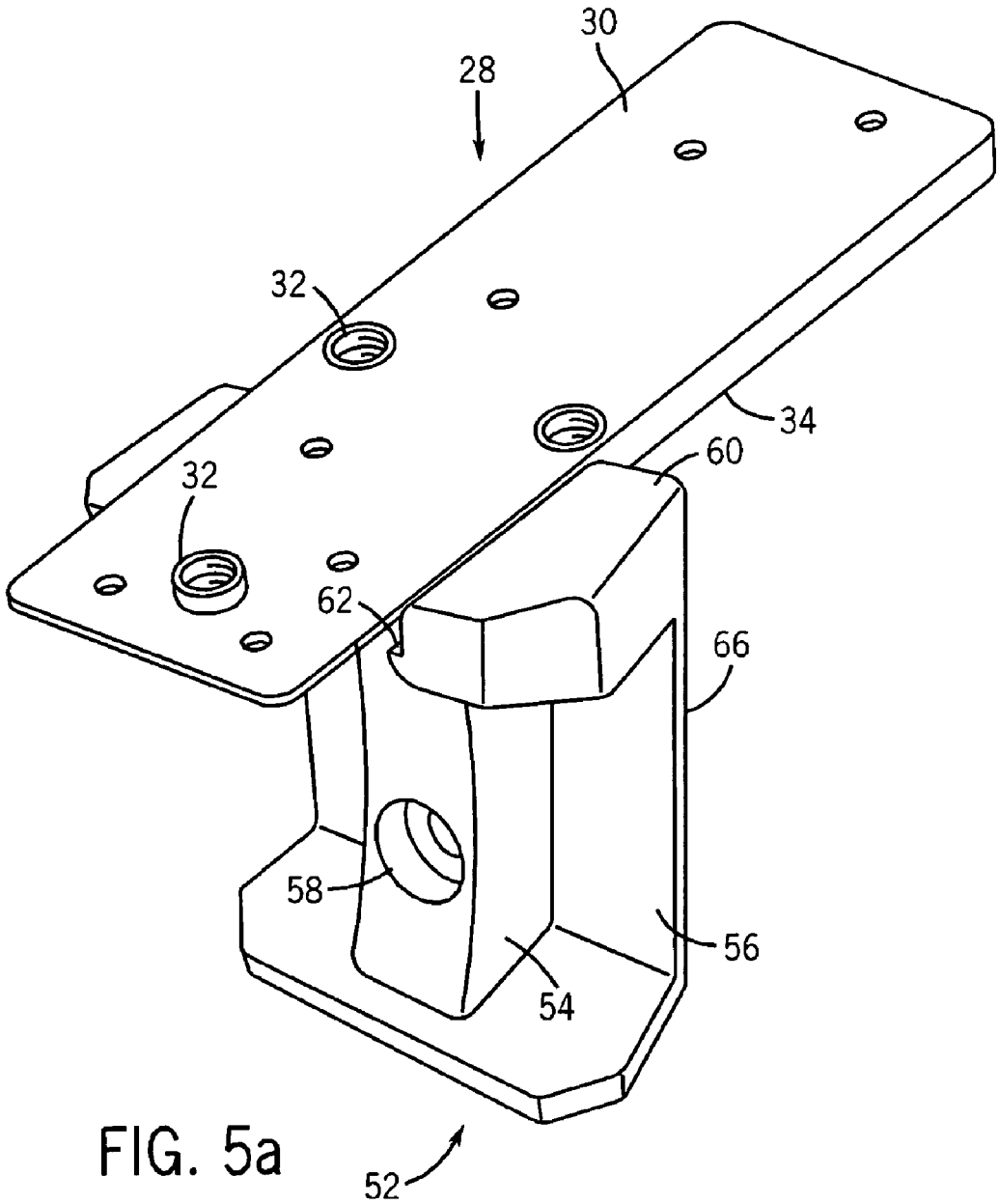
FIG. 5a illustrates a three-dimensional cutout view of a fingerboard support assembly mounted to a headblock.

Turning to FIG. 5a, a three-dimensional cutout view of a body 12 of a guitar 10 having headblock 52 with secured plate 28. Plate 28 includes bottom surface 30 with threaded inserts 32 to mount plate 28 to a fingerboard as previously described. Rail 34 is shown received by channel 62 in headblock 52. Headblock 52 includes ridge 54, side surface 45, aperture 58, top surface 62, and back surface 66.

Figure 5B:
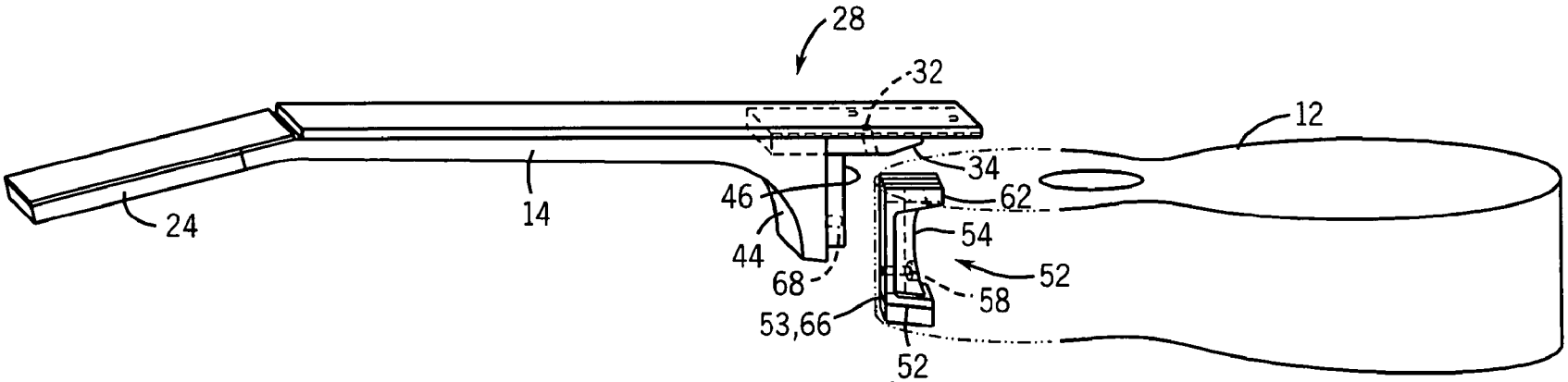
FIG. 5b illustrates a first step in a method of securing a neck of a guitar to a body of a guitar having an integrated fingerboard support assembly and mounted headblock.

FIG. 5b depicts an example first step of an assembly process of securing a neck 14 to a body 12 of guitar 10 is depicted. A completed neck assembly 47 includes neck 14, headstock 24, fingerboard support including plate 28, angled threaded insert 32, integral rail 34, heel 44, and threaded insert 68. A completed body 12 assembly includes headblock 52 with accompanying ribbed "C" surface 54, aperture 58, top surface 60, and back and substantially flat surface 66 which is mounted to shim 53, located between surface 66 and the interior surface of body 12.

Figure 5C:
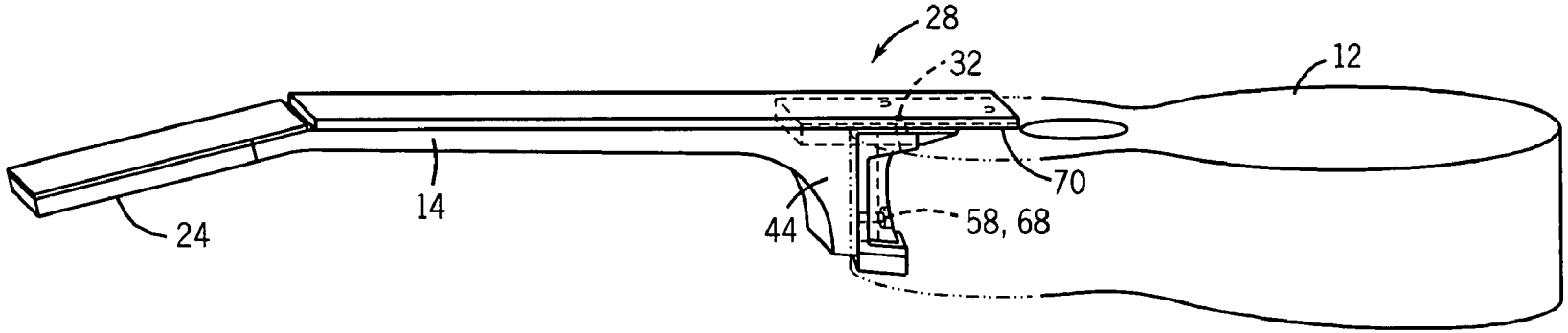
FIG. 5c illustrates a second step in the method, depicting an assembled guitar again having a fingerboard support assembly and headblock structures.

FIG. 5c illustrates a next step in the assembly process, showing a fully assembled neck to body joint. Here, attachment mechanisms such as screws are used to secure the neck assembly to body 12 using an angled configuration through threaded insert 32. A screw is penetrated through aperture 58 and tightened into threaded insert 68 to draw the headblock 52 laterally against the heel portion of neck 14. Tongue 46 penetrates an opening in body 12 to be received into a cavity created by the back surface of ridge 54 of headblock 52. Finally, an attachment mechanism such as a screw or bolt is used to securely affix the neck assembly through the body 12 in a vertical manner at location 70, corresponding to a threaded insert 32 in plate 28.

Figure 6:
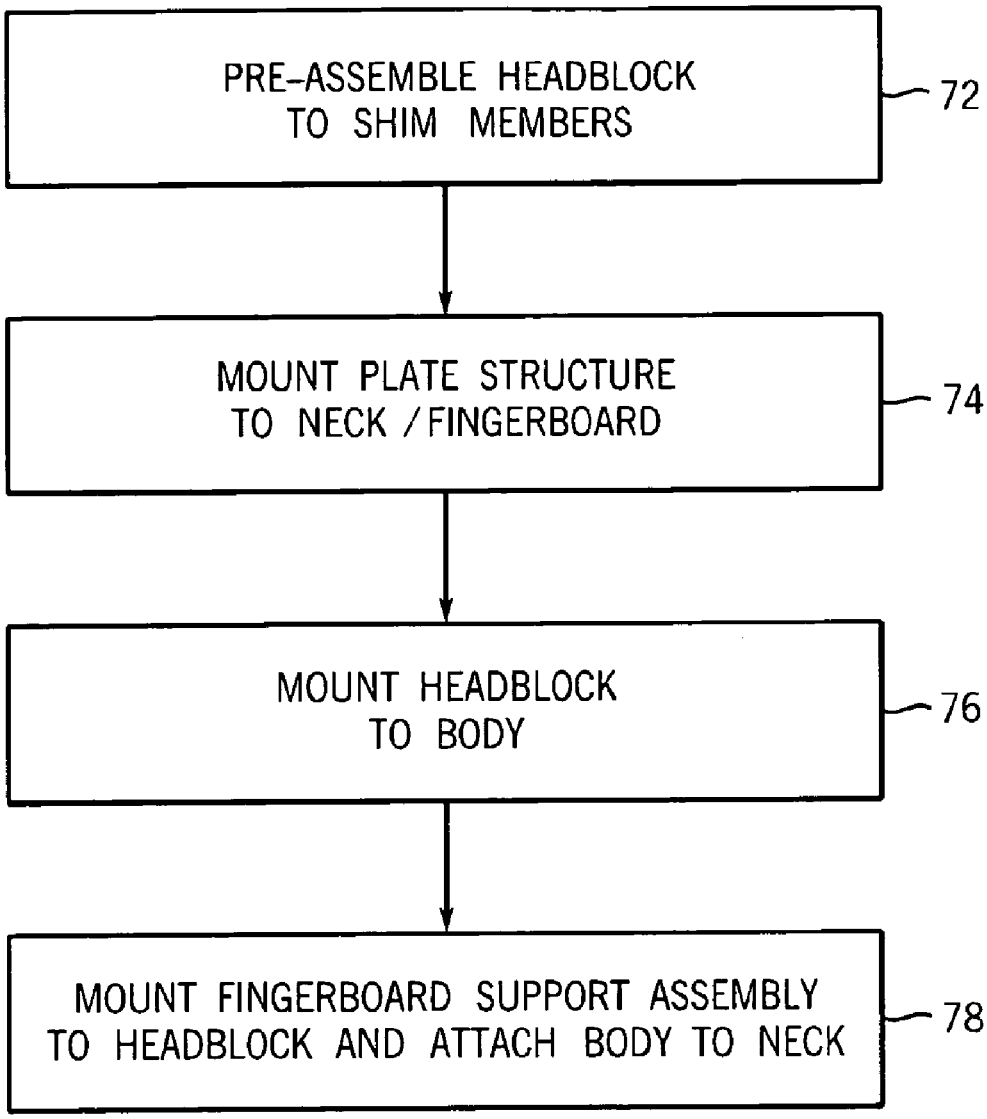
FIG. 6 illustrates a method of assembling a guitar including securing a neck of the guitar to a body of a guitar having an integrated fingerboard support assembly and headblock structure.

FIG. 6 illustrates a flow chart of a method of assembly of a guitar. As a first step, the headblock is preassembled by affixing the headblock to the various shim members using an epoxy or other strong glue or similar bonding material (step 72). A plate structure is mounted to the neck and fingerboard of a guitar (step 74). Next, a headblock is removably mounted to an interior surface of the body of the guitar, in close proximity to the neck-to-body joint area (step 76). Finally, the fingerboard support assembly, which includes the plate structure, is secured to the headblock using the angled screw configuration and additional attachment mechanisms, which have been previously described (step 78).

The concept of using a fingerboard support assembly including plate 28 in conjunction with a unique headblock 52 provides a novel and extremely rigid method of keeping the neck 14 and neck-to-body joint area of the body 12 in a precise and desirable alignment. The precise and desirable alignment is partly achieved by the selection of a choice of composite materials to form plate 28 and headblock 52 for a particular application. In addition, the specific engineering properties of the plate 28 structure, coupled with the properties of headblock 52, make contributions. Finally, the overall geometry of the subcomponents also plays a part.

The rigid structure of plate 28 and headblock 52 helps to eliminate changes in neck 14 angle and string action caused by environmental and climactic changes. In addition, the rigid nature of the structure helps to reduce energy loss from the string into the neck-to-body region of the guitar 12, which enhances the overall sustain of the guitar 12.

The composite headblock 52 can be made in a single size, as was previously described. With the use of shims 53, a single headblock can serve in a variety of guitar 10 applications. Headblock 52 has several surfaces which can interface with shim structures 53 to mate with the interior top, sides, and back of the body 12 of guitar 10. Again, using a variety of shims 53 simplifies manufacturing and reduces inventory. Again, a single-sized headblock can be used for multiple shapes and styles of instruments. The preassembly of the headblock to the shim members allows the overall assembly of guitar 10 to be processed with a water-based glue in an orderly sequence, instead of employing several types of glues in the same process, since the composite materials employed in plate 28 and headblock 52 cannot be bonded with water-based glues.

Overall, guitar 10 is more easily manufactured using the fingerboard support assembly and headblock structures previously described. In addition, the instrument is consistently of better quality.

While one or more embodiments of the present invention have been illustrated in detail, the skilled artisan will appreciate that modifications and adaptations to those embodiments may be made without departing from the scope of the present invention as set forth in the following claims.

What is claimed is:

1. A stringed musical instrument, comprising:

an acoustic body;

a neck having a tongue formed normal to a long axis of the neck and two channels formed in a surface parallel to the long axis of the neck;

a fingerboard mechanically coupled to the neck;

a plate having two integrated rails disposed on opposite sides of a first surface of the plate and extending above the first surface of the plate, the plate being flat across a second surface opposite the first surface of the plate, the plate being a carbon fiber reinforced plastic having a rigidity that varies across the plate, wherein first ends of the rails are disposed in the channels of the neck and the second surface of the plate is secured in a recessed cavity of the fingerboard; and a headblock mechanically coupled to the acoustic body, the headblock having a groove for receiving the tongue of the neck and two channels for receiving second ends of the rails to provide rigidity between the acoustic body and neck.

2. The stringed musical instrument of claim 1, further including a rod disposed in a groove formed in a surface along the long axis of the neck.

3. The stringed musical instrument of claim 2, wherein the rod is made of graphite, metal, or composite material.

4. The guitar of claim 1, wherein the headblock is made of composite material.

5. The guitar of claim 4, wherein the composite material of the headblock varies in rigidity.

6. The stringed musical instrument of claim 1, further including a shim disposed between the headblock and acoustic body.

7. The stringed musical instrument of claim 1, wherein the plate is secured to the recessed cavity of the fingerboard with adhesive.

8. The stringed musical instrument of claim 1, further including an aperture formed through the plate for securing the plate to the acoustic body.

* * * * *